No. 889,572. PATENTED JUNE 2, 1908.
E. BIGGS.
MACHINE FOR MASHING CHEESE.
APPLICATION FILED JULY 19, 1907.
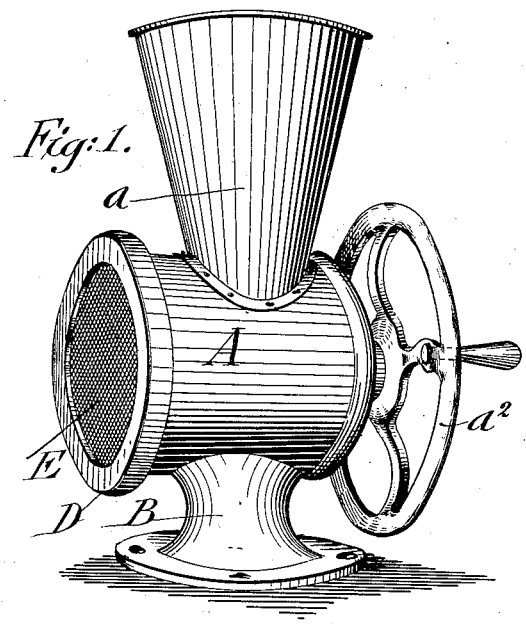
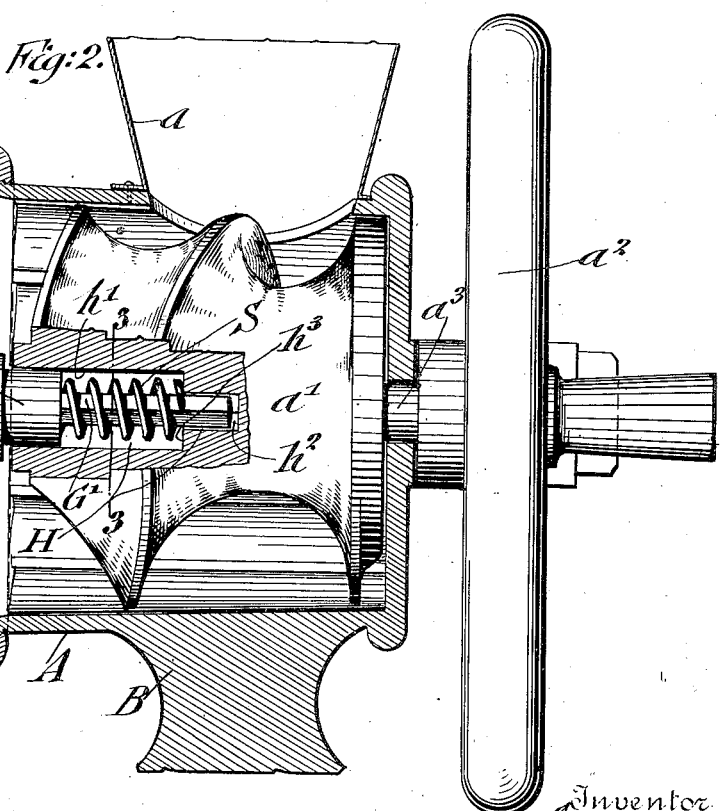
Witnesses
Fannie Fisk
H. H. Schrier.
Inventor
Edward Biggs
By his Attorneys
Lovett Goepel

UNITED STATES PATENT OFFICE.

EDWARD BIGGS, OF WEST NEW BRIGHTON, NEW YORK.

MACHINE FOR MASHING CHEESE.

No. 889,572.  Specification of Letters Patent.  Patented June 2, 1908.

Application filed July 19, 1907. Serial No. 384,524.

*To all whom it may concern:*

Be it known that I, EDWARD BIGGS, a citizen of the United States, residing in West New Brighton, in the borough of Richmond, county of Richmond, and State of New York, have invented certain new and useful Improvements in Machines for Mashing Cheese, of which the following is a specification.

This invention relates to machines for mashing cheese for bakers.

It is well known, that the quality of cheesecake is directly dependent on the condition of the mashed cheese used in connection therewith.

The object of the invention is to provide a machine in which the cheese used in connection with the making of cheese-cake, may be mashed very thoroughly into a homogeneous mass without lumps so as to have the consistency of butter when discharged from the machine.

For this purpose, my invention consists of a cheese-mashing machine comprising a casing having a feed screw therein for forcing the material out at the discharge end of the casing, a screen applied to the discharge end of the casing, a second screen, means for rotating the second screen, and means for pressing during rotation the second screen against the first.

The invention consists of further novel features and combination of parts which will be hereinafter described and finally pointed out in the claims.

In the accompanying drawings, Figure 1 is a perspective view of my improved machine, Fig. 2 is an enlarged vertical longitudinal section thereof, and Fig. 3 is a transverse section taken on line 3—3 of Fig. 2.

Similar letters of reference indicate corresponding parts.

Referring to the drawings, the casing A of my improved machine rests on the support B and is provided at its upper portion with a hopper $a$, into which the material is introduced. One end of the casing, which is preferably cylindrical in shape is provided with a cover having an opening for the passage of a shaft $a^3$ of a feed screw $a^1$, arranged longitudinally within the casing in order to feed the material to the discharge end on the rotation of the same, by means of a hand-wheel $a^2$. The other end of the casing is provided with a collar D, interiorly threaded to engage a corresponding screw-threaded portion on the end of the casing A. Supported by said collar D and removable therefrom, a screen E of suitable mesh is provided, which, when the collar is screwed up tightly against the casing, is clamped rigidly in position between the collar and casing as shown in Fig. 2. Coöperating with the screen E, a second screen F is provided which is caused to be pressed and simultaneously rotated against the first screen. In the embodiment illustrated the screens E and F are made of wire network so as to form reticulated plates. The second screen F, which is of suitable mesh, is provided with a collar G and to this is secured a shank $G^1$ of square cross section. The collar G is secured to the screen in such a manner that the portion of the screen F facing and pressing against the screen E presents an entirely free surface, care being taken that the means of fastening the collar to the screen do not present projections at that portion, as these projections would prevent the screen F from being forced into close contact with the screen E.

The feed-screw $a^1$ is provided at its discharge end with a socket H, one portion of which, $h^1$, is of circular cross section, while the other and innermost portion $h^2$ is of square or other polygonal cross section. The portion $h^2$ of the socket being of square cross section is engaged by the shank $G^1$, of the same cross section. Intermediate between the portion $h^1$ of the socket and the portion $h^2$ a shoulder $h^3$ is formed. Between the shoulder $h^3$ and the collar G of the screen F a helical spring S is interposed, which causes the screen F to be urged or pressed against the screen E into close contact therewith.

The operation of the improved device is as follows: The material to be reduced is placed within the hopper $a$ and fed in the well-known manner by means of the feed-screw $a^1$. The feed-screw forces the material under pressure toward the discharge end of the casing and through the screenlike rubbing-disk or screen F. During this operation the disk or screen F is rotated and held in close contact with the screen E by means of the spring S. Under these conditions the material which has been forced through the screen F, and now is interposed between the two screens F and E, is subjected to a thorough and effective rubbing action by and between said screens, until forced through the screen E. The simultaneous rubbing, pressing and squeezing action will cause the material to be completely free of all lumps and to form a perfectly smooth and homogeneous mass.

I do not wish to be limited to the details of the particular embodiment of my invention herein set forth, as such may be departed from without digressing from the spirit of my invention.

Having thus described my invention I claim as new and desire to secure by Letters Patent:

1. In a cheese-mashing machine, the combination of a stationary reticulated plate, and a second reticulated plate rotatable in contact therewith.

2. In a cheese-mashing machine, the combination of a stationary reticulated plate, another reticulated plate having its face rotatable in contact with that of said stationary plate, and means by which said last-named plate is rotated and the material forced through both of said plates.

3. In a cheese-mashing machine, the combination of a screen, a second screen, means to rotate the second screen, and means to simultaneously press it against the first.

4. In a cheese-mashing machine, having a casing and a feed-screw therein, a screen applied to the discharge end of the casing, a second screen, means for pressing the second screen against the first screen, and means for rotating the second screen.

5. In a cheese-mashing machine having a casing and a feed-screw therein, provided at its discharge end with a socket, the combination of a screen at the discharge end of the casing, a second screen, a shank secured to the second screen and engaging the socket of the feed-screw, and a spring interposed between the feed-screw and the second screen.

In testimony, that I claim the foregoing as my invention, I have signed my name in presence of two subscribing witnesses.

EDWARD BIGGS.

Witnesses:
HENRY J. SUHRBIER,
FANNIE FISK.